US006957806B2

(12) United States Patent
Tubbs

(10) Patent No.: US 6,957,806 B2
(45) Date of Patent: Oct. 25, 2005

(54) AIRSPRING ASSEMBLY

(75) Inventor: Orain Tubbs, Lumberton, TX (US)

(73) Assignee: The Modern Group Limited, Beaumont, TX (US)

( * ) Notice: Subject to any disclaimer, the term of this patent is extended or adjusted under 35 U.S.C. 154(b) by 0 days.

(21) Appl. No.: 10/317,648

(22) Filed: Dec. 12, 2002

(65) Prior Publication Data

US 2004/0113335 A1 Jun. 17, 2004

(51) Int. Cl.[7] .................................................. F16F 1/04
(52) U.S. Cl. ...................... 267/34; 92/40; 92/43; 92/44; 92/94; 267/122; 267/64.27; 267/166.1
(58) Field of Search ......................... 267/64.11–64.28, 267/122, 286–289, 166–179, 3, 33–35, 152–153, 267/4, 221, 226, 256, 259, 113, 116, 166.1; 106/198.1; 105/453, 198.1, 199.1–199.2; 92/63, 94, 99, 40, 43, 44, 106; 280/124.157, 280/124.162, 124.163, 124.158

(56) References Cited

U.S. PATENT DOCUMENTS

| | | | |
|---|---|---|---|
| 284,713 A | | 9/1883 | Bemis |
| 1,032,454 A | | 7/1912 | Wainwright |
| 1,928,526 A | | 9/1933 | Fellabaum |
| 2,192,355 A | | 3/1940 | Kuhn |
| 2,257,913 A | | 10/1941 | Maranville |
| 2,262,823 A | * | 11/1941 | Stearns ..................... 251/30.02 |
| 2,361,575 A | | 10/1944 | Thompson |
| 2,400,048 A | * | 5/1946 | Barton ........................... 92/10 |
| 2,711,315 A | * | 6/1955 | Mosebach ................ 267/64.27 |
| 2,715,009 A | * | 8/1955 | Beekley ...................... 251/61.3 |
| 2,756,048 A | * | 7/1956 | Pfeiffer et al. ........... 267/64.27 |
| 2,761,927 A | * | 9/1956 | Szypulski ................. 200/83 C |
| 2,874,957 A | | 2/1959 | Davis |
| 2,995,355 A | | 8/1961 | Stump |
| 3,037,763 A | * | 6/1962 | Steinhagen ................... 267/34 |
| 3,224,345 A | * | 12/1965 | Hans .............................. 92/94 |
| 3,343,830 A | * | 9/1967 | Dean et al. ................... 267/34 |
| 3,552,767 A | * | 1/1971 | Yew et al. ............... 280/6.159 |
| 3,572,676 A | * | 3/1971 | Yew ............................ 267/34 |
| 3,632,130 A | * | 1/1972 | Novotny .................. 280/6.159 |
| 3,709,461 A | * | 1/1973 | Johnson ....................... 251/58 |
| 3,721,417 A | | 3/1973 | Skala et al. |
| 3,733,972 A | * | 5/1973 | Campbell ...................... 92/37 |
| 3,917,244 A | * | 11/1975 | Peddinghaus ................ 267/34 |
| 4,005,858 A | | 2/1977 | Lochner |
| 4,120,489 A | * | 10/1978 | Borlinghaus ............. 267/166.1 |
| 4,174,827 A | | 11/1979 | Hirtreiter et al. |
| 4,398,704 A | | 8/1983 | Buchanan, Jr. et al. |
| 4,505,188 A | * | 3/1985 | Weydt et al. .................. 92/94 |
| 4,574,450 A | * | 3/1986 | Fannin et al. ............ 29/402.08 |
| 4,828,237 A | * | 5/1989 | Neff ........................... 267/221 |

(Continued)

FOREIGN PATENT DOCUMENTS

DE          2361346        *    6/1975

*Primary Examiner*—Douglas C. Butler
(74) *Attorney, Agent, or Firm*—Fulbright & Jaworski LLP

(57) ABSTRACT

An improved airspring assembly includes a collapsible support member disposed within the pressurizable chamber of an airspring having a flexible sidewall. The support member is configured such that it extends and collapses along a longitudinal axis of the chamber responsive to pressurization and depressurization of the chamber, respectively. The support member also is configured such that it retains a substantially rigid outer perimeter, thereby restricting movement of the chamber's flexible sidewall toward the longitudinal axis when the chamber is depressurized. The support member also is configured such that it does not interfere with the full stroke of the airspring.

28 Claims, 4 Drawing Sheets

U.S. PATENT DOCUMENTS

| | | | |
|---|---|---|---|
| 5,860,638 A * | 1/1999 | Wolf et al. | 267/140.13 |
| 5,956,314 A | 9/1999 | Ishimatsu et al. | |
| 6,398,198 B1 | 6/2002 | Okamoto | |

* cited by examiner

AIRSPRING ASSEMBLY

TECHNICAL FIELD

The present invention is related generally to airspring suspension systems for vehicles, and, more particularly, to an improved airspring suspension system that reduces the potential for damage to the air bag portion of the airspring due to pinching of the bag portion when air pressure is released.

BACKGROUND OF THE INVENTION

In general, an airspring is a pneumatic spring configured as a column of gas confined within a container. The pressure of the confined gas, and not the structure of the container, acts as the force medium of the spring. A wide variety of sizes and configurations of airsprings are available, including sleeve-type airsprings, bellows-type airsprings, convoluted-type airsprings, rolling lobe airsprings, etc. Such airsprings commonly are used in both vehicular and industrial applications. Vehicular applications include suspension systems for automobiles, light trucks, semi-tractors and trailers, buses, trains, recreational vehicles, etc., while industrial applications include use in vibration isolation systems.

Airsprings, regardless of their size and configuration, share many common elements. In general, an airspring includes a flexible, sleeve-like member made of fabric-reinforced rubber that defines the sidewall of an inflatable container. Each end of the flexible member is closed by an enclosure element, such as a bead plate which is attached to the flexible member by crimping. The uppermost enclosure element typically also includes air supply components and mounting elements (e.g., studs, blind nuts, brackets, pins, etc.) to couple the airspring to the vehicle structure. The lowermost enclosure element also typically includes mounting elements to couple the airspring to the vehicle axle.

In vehicular applications, airspring suspensions offer many advantages over conventional steel spring-type suspension arrangements, particularly with respect to driver discomfort, cargo damage, and vehicle deterioration. For example, the principle drawback of steel spring suspension systems is their degree of stiffness. Because steel springs must be designed to handle the vehicle's maximum load, the suspension system often is too stiff to provide adequate, or any, shock absorption at light or no-load conditions. Airspring suspension systems, on the other hand, can accommodate load changes simply by adjusting the amount of air pressure in the inflatable container. Air pressure adjustments can be performed automatically via appropriate sensor and control arrangements.

However, the ability to pressure and depressurize the inflatable chamber has created a new problem unique to airspring suspensions. In particular, as air is being removed from the inflatable chamber, the top enclosure element begins to move toward the bottom enclosure element of the airspring, and the flexible sidewall of the container has a tendency to collapse inwardly on itself. Such collapse can result in pinching of the flexible material of the sidewall, which eventually can result in wear and tear, leading to perforation or other damage to the airbag.

Accordingly, it would be desirable to provide an improved airspring design which restricts inward collapse of the flexible sidewall, thus preventing damage to and prolonging the useful life of the airspring assembly. Moreover, it would be desirable to provide a method whereby the improvement can easily be added to existing airspring designs.

BRIEF SUMMARY OF THE INVENTION

The present invention is directed to an airspring assembly which is configured in a manner that reduces instances of damage to or failure of the flexible sidewall of the assembly due to the inward collapse and resultant pinching of the sidewall portion when air is removed from the airspring.

In accordance with one aspect of the invention, the airspring comprises a first end member and a second end member, and a flexible sidewall disposed between the first and second end member to define a chamber therebetween having a longitudinal axis. The chamber is configured to expand and retract along the longitudinal axis. The airspring further includes a collapsible member disposed within the chamber and displaceable between an extended state and a collapsed state responsive to expansion and retraction of the chamber. The collapsible member is configured to substantially restrict movement of the flexible sidewall toward the longitudinal axis as the chamber contracts.

In accordance with another aspect of the invention, a suspension system for a vehicle comprises a top member and a base member, wherein at least one of the top member and the base member is movable relative to the other. A sidewall made of a flexible material extends substantially vertically from the base member to the top member to define an inflatable chamber therebetween. A sidewall support member disposed within the inflatable chamber is configured such that it retains a substantially rigid lateral perimeter while being axially extensible between an extended state and a collapsed state responsive to relative movement of the top member and the base member. This configuration of the sidewall support member substantially restricts lateral inward collapse of the sidewall while the inflatable chamber is deflating.

A method of completing an airspring assembly also is provided. The method comprises deploying a collapsible member within a chamber having an open end, a closed end, and a flexible sidewall between the open and closed ends. The flexible sidewall is configured to expand and retract generally along a longitudinal axis between the open and closed ends. The collapsible member is extensible and collapsible generally along the longitudinal axis responsive to expansion and retraction of the flexible sidewall and is configured to restrict lateral movement of the flexible sidewall toward the longitudinal axis as contraction occurs. The method further comprises coupling an end of the collapsible member to a cover member, and affixing the cover member to the flexible sidewall proximate the open end.

A method of completing a suspension system coupled between the chassis and axle of a vehicle also is provided. The method comprises detaching a first airspring assembly from the chassis and the axle of the vehicle and deploying a second airspring assembly. The second assembly comprises a pressurizable chamber having a top end, a bottom end, a flexible sidewall extending between the top and bottom ends, and a collapsible member disposed within the pressurizable chamber. The collapsible member is extensible and collapsible along a longitudinal axis extending between the top and bottom ends responsive to pressurization and depressurization of the pressurizable chamber, respectively. The collapsible member also is configured to restrict lateral movement of the flexible sidewall toward the longitudinal axis as depressurization occurs. The method further comprises attaching the top end and the bottom end of the second airspring assembly to the chassis and the axle, respectively.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

For ease of reference, the following description will be made with reference to a rolling lobe or sleeve-type airspring. However, it should be understood that the invention is applicable to any type of airspring, such as a single-convoluted airspring, which may be prone to sidewall damage when depressurization occurs.

Figure 1:
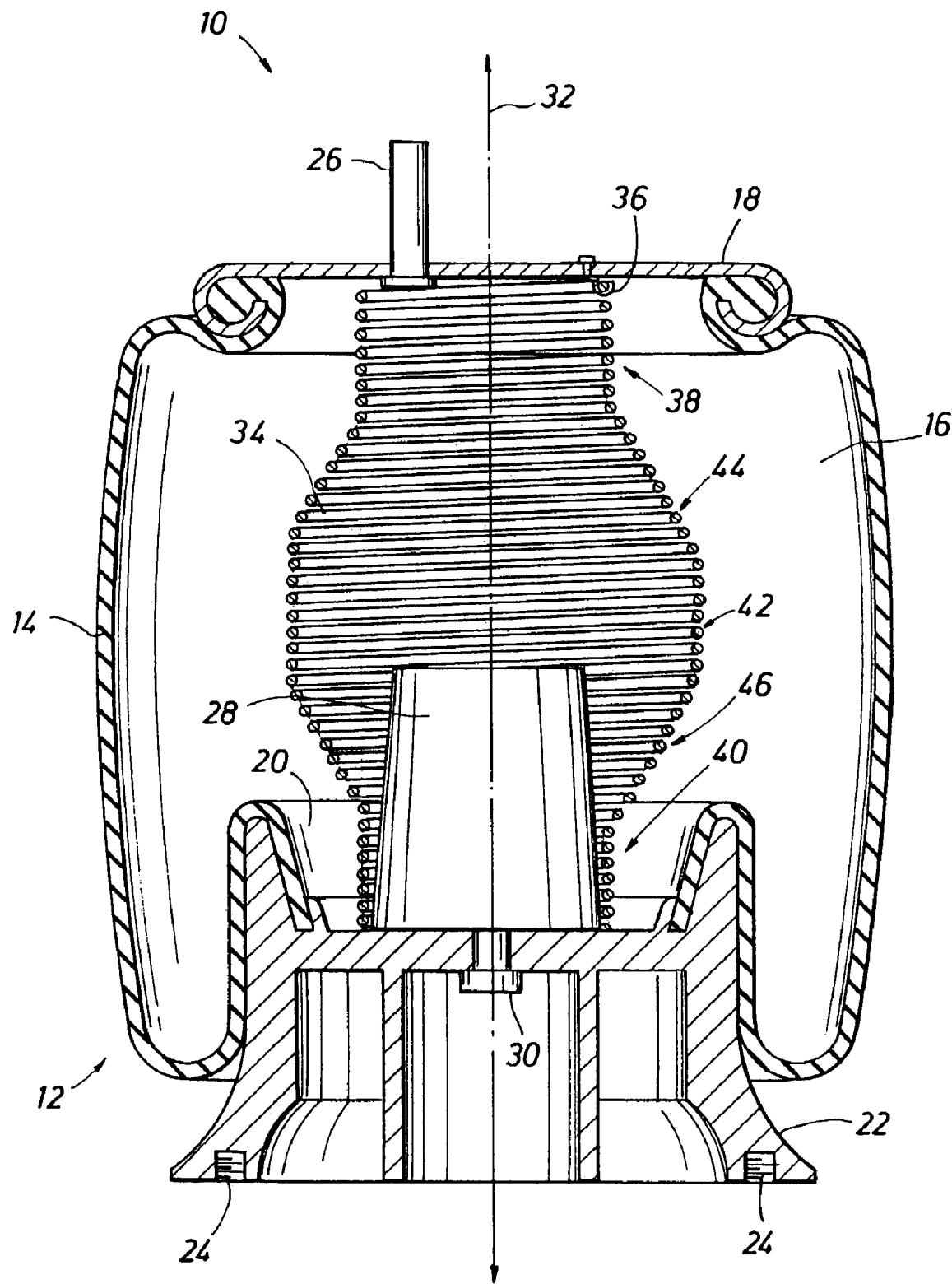
FIG. 1 is a cross-sectional view of an embodiment of a rolling lobe or sleeve-type airspring having an exemplary sidewall support member.

An exemplary application of the improvement to an airspring is illustrated in FIG. 1, which shows a cross-sectional view of a sleeve-type or rolling lobe airspring 10 appropriate for use in a vehicle suspension system. The airspring 10 includes a flexible, sleeve-like member 12 made of fabric-reinforced rubber that defines a sidewall 14 of an inflatable or pressurizable chamber or container 16. Each end of the container 16 is closed by an enclosure element. For example, in the embodiment illustrated in FIG. 1, the uppermost end of the container 16 is enclosed by an upper enclosure element 18, such as a bead plate, which is attached to the flexible member 12 by rolling and crimping. A lower enclosure element 20 is attached to the lower end of the flexible member 12. For example, as shown in FIG. 1, the lower element 20 may be configured as a cup-shaped enclosure member, which may be integrally molded to the flexible member 12. In alternative configurations, such as convoluted-type airsprings, the lower enclosure element 20 may be a bead plate rolled and crimped to the flexible member 12.

In the embodiment illustrated, the cup-shaped member 20 is coupled to a piston 22, which is a shaped, metal or plastic component configured to both support and provide a surface on which the flexible member 12 can roll. The cup-shaped member 20 may be attached to the piston 22 by an appropriate attachment element (e.g., a bolt 30). Alternatively, member 20 and piston 22 may be an integral component. For example, piston 22 may be shaped such that it includes a concave or cup-shaped portion. The piston 22 also includes appropriate mounting elements, such as tapped holes 24, to secure the airspring 10 to a lower mounting surface, such as the vehicle axle (not shown). Alternatively, in embodiments which do not include a piston 22, the cup-shaped member 20 or other lower enclosure element (e.g., a bead plate) may include appropriate mounting elements.

An air supply component 26 providing for ingress and egress of air to pressurize and depressurize the container 16, respectively, is coupled to the upper enclosure element 18. The upper enclosure element 18 also may include appropriate mounting elements (not shown) for attaching the upper end of the airspring 10 to a mounting surface (e.g., the vehicle chassis) or, alternatively, may be attached to a mounting plate (not shown) having the appropriate mounting elements.

In the embodiment illustrated in FIG. 1, the airspring 10 also includes a "bumper" 28 that protrudes upwardly within the container 16 from the lower enclosure member 20. The bumper 28, which is shown attached to the member 20 and the piston 22 via a bolt 30, typically is made of rubber, plastic, or a fabric-reinforced rubber material and is configured to support the vehicle when the airspring 10 is depressurized, such as when the vehicle is not in use or in the event of a failure while on the road. When the container 16 is depressurized, the sidewall 14 collapses and rolls over the piston 22 until the upper enclosure member 18 contacts the bumper 20. In alternative embodiments, the bumper 28 may be omitted or may have a lower height. If such is the case, then when the container 16 is depressurized and the sidewall 14 collapses, the upper enclosure member 18 will move downwardly until it contacts the lower enclosure member 20.

Airsprings, such as the airspring 10 described in the foregoing paragraphs, are readily available from multiple manufacturers, including Goodyear and Firestone. The flexible member 12 of such airsprings, however, is prone to damage resulting from the tendency of the sidewall 14 to collapse inwardly toward a longitudinal axis 32 of the container 16 as depressurization occurs. Repeated pinching of the flexible member 12 eventually may lead to perforations which prevent pressurization of the container 16. When such failures occur, the entire airspring 10 must be removed and replaced.

These types of failures can be prevented by providing a collapsible sidewall support member 34 as shown in FIG. 1. In the illustrated embodiment, the support member 34 is configured as a helical coil. The upper end of the support member 34 is shown attached to the upper enclosure member 18 via a hook-like tab 36, but may readily be attached by any other suitable attachment element. The lower end of the support member 34 is positioned over the bumper 28 and rests within the cup-shaped lower enclosure member 20. In embodiments which do not include the bumper 28, the lower end of the support member 34 may simply rest within or on the lower enclosure member 20, or, alternatively, may be attached to the lower enclosure member 20 by any appropriate means.

The support member 34 has elastic properties, such that it is both extendible and collapsible along the longitudinal axis 32 as the container 16 is pressurized and depressurized, respectively. At the same time, the support member 34 is configured to maintain a substantially rigid outer perimeter such that it can resist lateral movement of the sidewall 14 toward the longitudinal axis 32 as the container 16 is depressurized. In an exemplary embodiment, the support member 34 is not suitable for supporting any type of load; rather, all load-bearing functions are provided by the air pressure within the container 16. Indeed, it is preferable to configure the support member 34 such that it extends and collapses without interfering with the full stroke range of the airspring 10.

Figure 2:
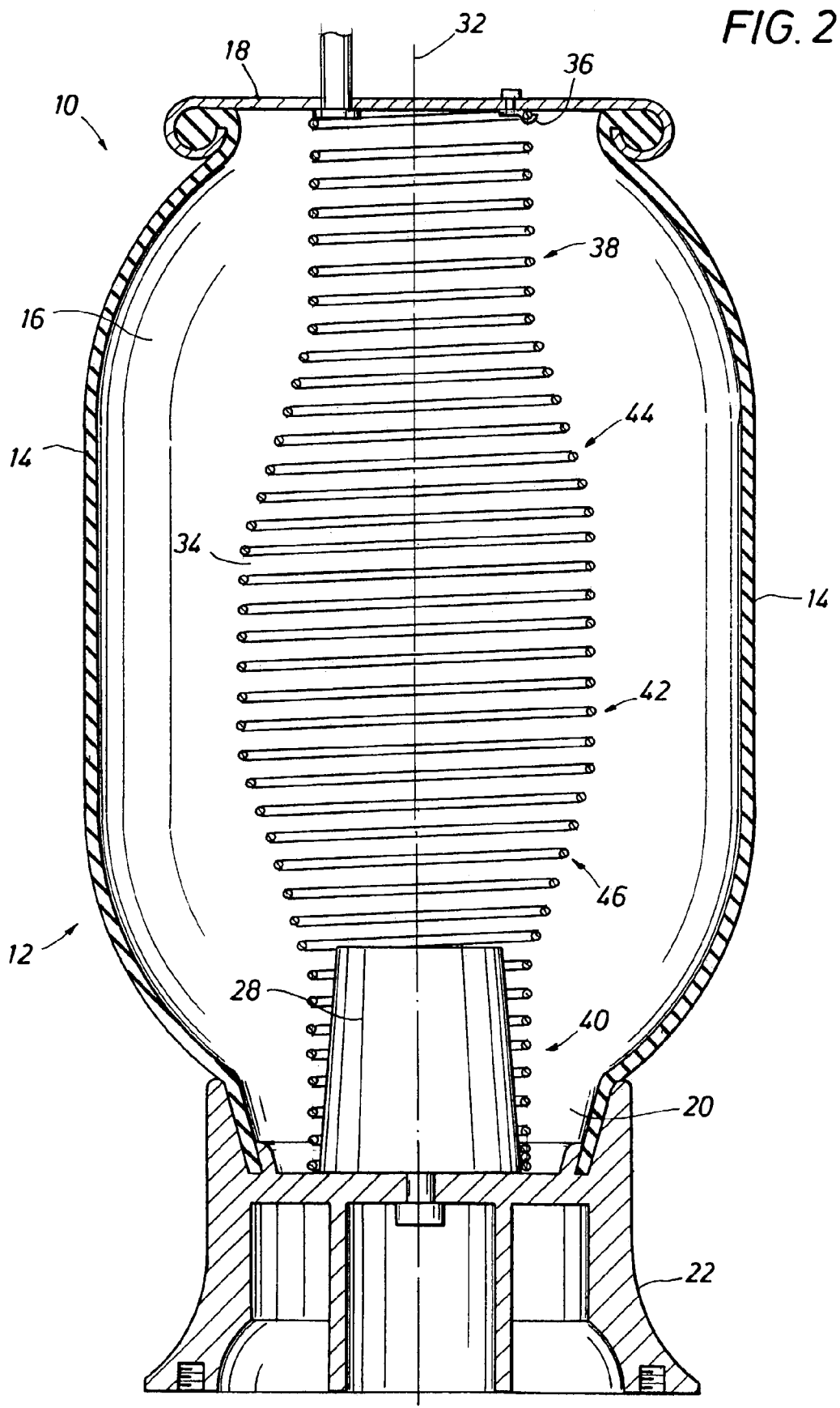
FIG. 2 is a cross-sectional view of the airspring of FIG. 1 when fully pressurized.
Figure 3:
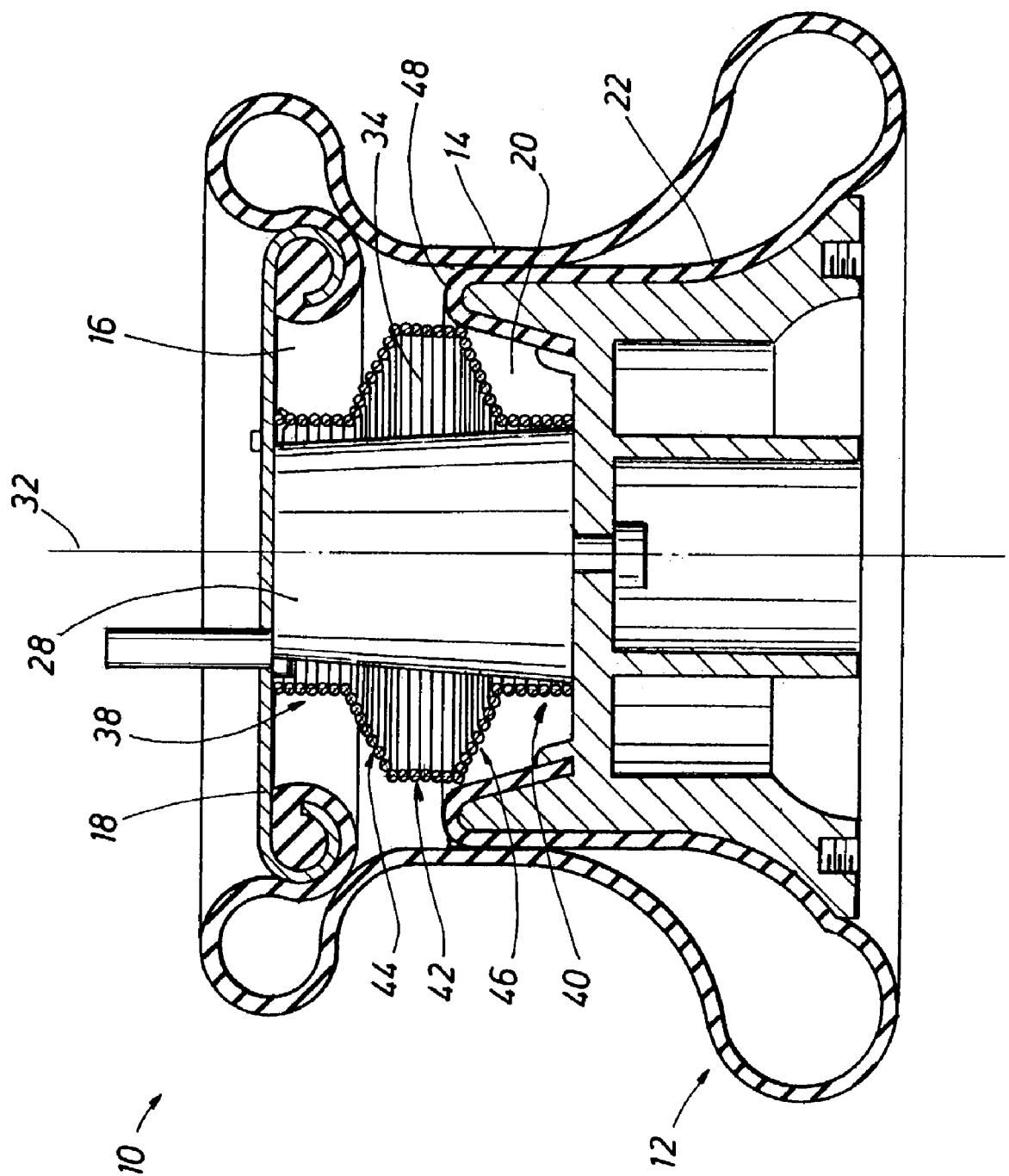
FIG. 3 is a cross-sectional view of the airspring of FIG. 2 when fully depressurized.

The full stroke range of the airspring 10 may be seen with reference to FIGS. 2 and 3. In FIG. 2, the container 16 is fully pressurized such that the upper enclosure member 18 is displaced from the lower enclosure member 20 along the longitudinal axis 32, and the flexible member 12 is in a fully extended position. In FIG. 3, the container 16 is completely depressurized such that the upper enclosure member 18 is in contact with the bumper 28, and the flexible member 12 has rolled along the outer surface of the piston 22.

In the embodiment illustrated in FIGS. 1–3, the sidewall support member 34 has portions with varying diameters. An upper end portion 38 and a lower end portion 40 of the support member 34 have several coils all having the substantially the same diameter and sized to fit against the upper and lower enclosure members 18 and 20, respectively. The primary support for the sidewall 14 is provided by a central portion 42 of the support member 34. Thus, the diameter of the central portion 42 preferably is as large as practicable to minimize inward collapse of the sidewall 14 as depressurization occurs. Transition portions 44 and 46 of the support member 34 include coils having a graduated diameter. This configuration is particularly advantageous since it permits the portions 44 and 46 to fold up or collapse in a manner that minimizes the height of the support member 34 when in the fully collapsed state.

Figure 4:
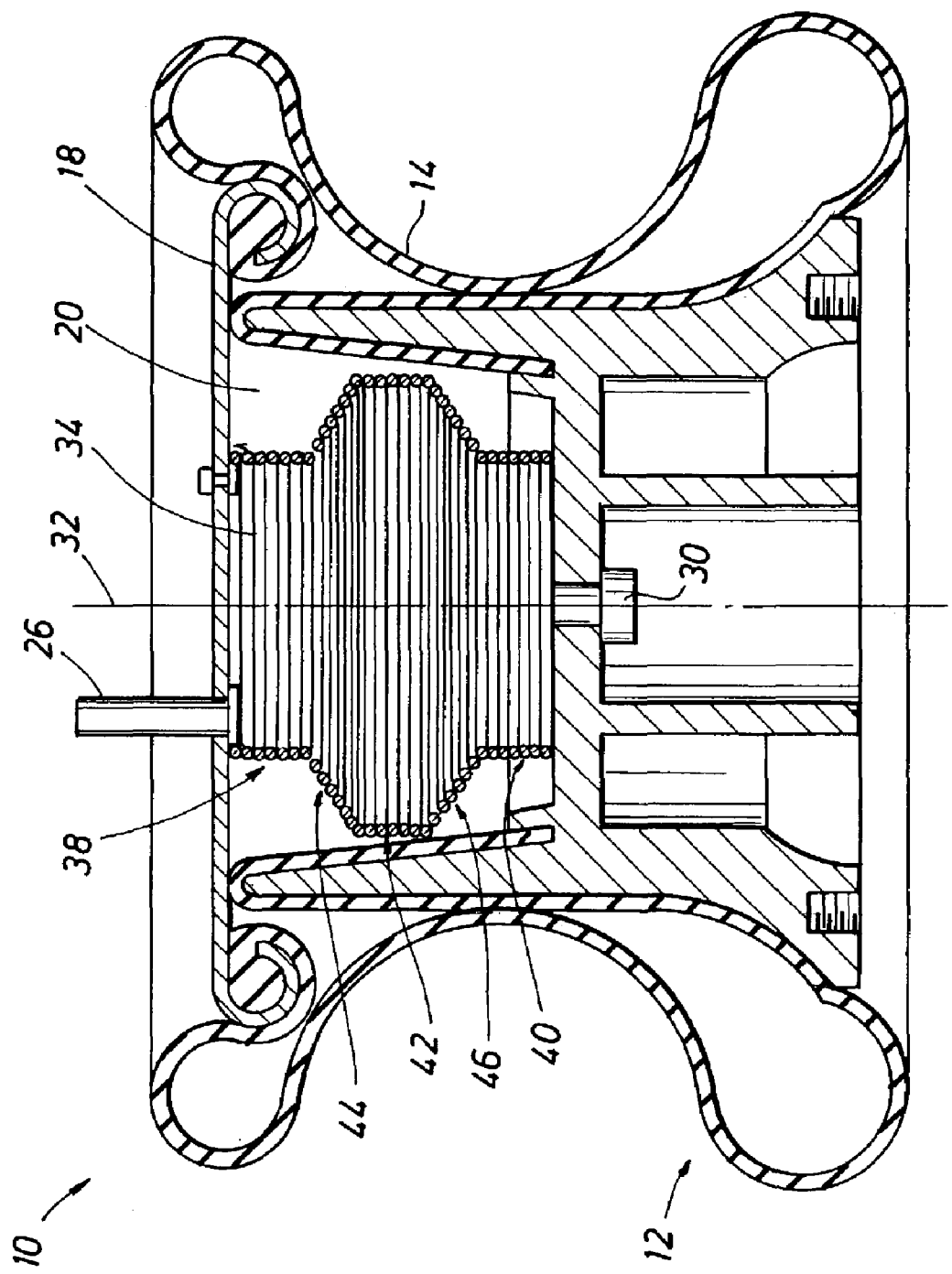
FIG. 4 is a cross-sectional view of another exemplary embodiment of an airspring when fully depressurized.

With reference to the embodiment illustrated in FIG. 3 in which the container 16 is fully depressurized, it can be seen that the sidewall support member 34 does not interfere with the full stroke of the airspring 10. It can further be seen from FIG. 3 that the transition portion 44 is fully collapsed, while the transition portion 46 remains in a partially extended state. In embodiments in which the bumper 28 is omitted or has a height that does not extend above the upper edge 48 of the lower enclosure member 20, the sidewall support member 34 may be configured such that the central portion 42 may fit fully within the cup-shaped lower enclosure member 20, allowing both transition portions 44 and 46 to fully collapse. Such an embodiment is illustrated in FIG. 4.

It should be apparent from the foregoing discussion that any of a variety of configurations of the collapsible sidewall support member 34 are contemplated. That is, the support member 34 can be configured as any type of elastic or collapsible member that minimizes inward collapse of at least portions of the sidewall 14, while minimally interfering with the full stroke of the airspring 10. Thus, for example, the support member 34 may have a uniform diameter provided that, when in the fully collapsed state, interference with the stroke of the airspring 10 is minimized. Further, the support member 34 need not have a circular outer perimeter, but may be configured in other manners such that at least a portion of the periphery presents a rigid barrier that minimizes inward collapse of portions of the sidewall 14. Still further, the support member 34 may be made of any of a variety of materials, such as metal, polymers, or plastic, which are suitably rigid to resist inward collapse of the sidewall 14.

It should further be apparent from the foregoing discussion that the existing designs of airsprings easily may incorporate the sidewall support member 34 and that already-assembled airsprings may be retrofitted with the improvement. For example, incorporation of the sidewall support member 34 into an existing assembly process entails providing the upper enclosure member 18 with an attachment element, such as the hook-like tab 36, attaching the upper end of the member 34 to the hook 36, positioning the support member 34 within the container 16, and then securing the upper enclosure member 18 to the flexible member 12. Similarly, in some embodiments, already-assembled airsprings may be removed from the shelf or detached from the vehicle chassis and axle, the upper enclosure member 18 removed, and the support member 34 positioned within the container 16 and attached to the existing or a replacement upper enclosure member 18 as described above. The upper enclosure member 18 can be reattached to the flexible member 12 in the conventional manner. The completed assembly 10 then may be replaced on the shelf or re-attached to the vehicle chassis and axle for immediate use.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An airspring, comprising:
   a first end member;
   a second end member;
   a flexible sidewall disposed between the first and second end members to define a chamber therebetween having a longitudinal axis, the chamber configured to expand and retract generally along the longitudinal axis, said flexible sidewall extending substantially vertically from the first end and second end members; and
   a substantially non-load bearing collapsible member having an upper end portion and a lower end portion, and a sidewall support portion, said collapsible member disposed within the chamber and displaceable between an extended state and a collapsed state responsive to expansion and contraction of the chamber, the collapsible member being configured to substantially restrict movement of the flexible sidewall toward the longitudinal axis as the chamber retracts;
   wherein the sidewall support portion has a diameter greater than a diameter of the upper end portion and a diameter of the lower end portion.

2. The airspring as recited in claim 1, wherein the collapsible member is configured as a helical coil.

3. The airspring as recited in claim 1, wherein the collapsible member is made of a metallic material.

4. The airspring as recited in claim 1, wherein the collapsible member is longitudinally extendible while retaining a substantially rigid lateral perimeter.

5. The airspring as recited in claim 1, wherein the collapsible member is configured such that, when in the collapsed state, the second end member supports the first end member.

6. The airspring as recited in claim 5, wherein the second end member has a recessed portion, and the collapsible member is configured such that it fits within the recessed portion when in the collapsed state.

7. The airspring as recited in claim 1, wherein the collapsible member comprises a plurality of graduated coils configured such that at least a first coil fits within an adjacent coil when the collapsible member is in the collapsed state.

8. The airspring as recited in claim 1, wherein the collapsible member is coupled to the first end member.

9. The airspring as recited in claim 1, wherein the upper end portion and lower end portion have the substantially same diameter.

10. The airspring as recited in claim 1, wherein the upper end portion and lower end portion are sized to fit against the first end member and second end member, respectively.

11. The airspring as recited in claim 1, wherein the upper end portion and lower end portion include coils having a graduated diameter.

12. The airspring as recited in claim 1, wherein the collapsible member includes a first transition portion, a second transition portion, and a sidewall support portion, said sidewall support portion disposed between said first and second transition portion.

13. A suspension system for a vehicle, comprising:
a top member;
a base member, wherein at least one of the top member and the base member is movable relative to the other;
a sidewall made of a flexible material and extending substantially vertically from the base member to the top member to define an inflatable chamber therebetween; and
a substantially non-load bearing sidewall support member having an upper end portion and a lower end portion, and a sidewall support portion, said sidewall support member disposed within the inflatable chamber, the sidewall support member retaining a substantially rigid lateral perimeter while being axially extensible between an extended state and a collapsed state responsive to relative movement of the top member and the base member, such that, as the inflatable chamber deflates, lateral inward collapse of the sidewall is substantially restricted;
wherein the sidewall support portion has a diameter greater than a diameter of the upper end portion and a diameter of the lower end portion.

14. The suspension system as recited in claim 13, wherein the sidewall support member is configured as a coil.

15. The suspension system as recited in claim 13, wherein the sidewall support member is made of a metallic material.

16. The suspension system as recited in claim 13, wherein the sidewall support member is configured such that, when in the collapsed state, the base member supports the top member.

17. The suspension system as recited in claim 16, wherein the base member includes a recessed portion, and wherein the sidewall support member is configured to fit within the recessed portion when in the collapsed state.

18. The suspension system as recited in claim 16, wherein the base member comprises a bumper, and wherein the top member contacts the bumper when the sidewall support member is in the collapsed state.

19. The suspension system as recited in claim 13, wherein the upper end portion and lower end portion have the substantially same diameter.

20. The suspension system as recited in claim 13, wherein the upper end portion and lower end portion are sized to fit against the first end member and second end member, respectively.

21. The suspension system as recited in claim 13, wherein the upper end portion and lower end portion include coils having a graduated diameter.

22. The suspension system as recited in claim 13, wherein the collapsible member includes a first transition portion, a second transition portion, and a sidewall support portion, said sidewall support portion disposed between said first and second transition portion.

23. A method of completing an airspring assembly, the method comprising:
deploying a substantially non-load bearing collapsible member within a chamber,
said collapsible member having an upper end portion and a lower end portion, and a sidewall support portion,
said chamber having a first end, a second end, and a flexible sidewall between the first and second ends, the flexible sidewall extending substantially vertically from the first end and second end, the flexible sidewall configured to expand and retract generally along a longitudinal axis between the first and second ends,
wherein the collapsible member is extensible and collapsible generally along the longitudinal axis responsive to expansion and contraction of the flexible sidewall, and wherein the collapsible member is configured to restrict lateral movement of the flexible sidewall toward the longitudinal axis as retraction occurs;
wherein the sidewall support portion has a diameter greater than a diameter of the upper end portion and a diameter of the lower end portion;
coupling an end of the collapsible member to a cover member; and
affixing the cover member to the flexible sidewall proximate the first end.

24. The method as recited in claim 23, wherein the collapsible member is longitudinally extendible while retaining a substantially rigid lateral perimeter.

25. The method as recited in claim 23, wherein the collapsible member is configured such that, when in the collapsed state, the first end contacts the second end.

26. A method of completing a suspension system coupled between a chassis and axle of a vehicle, the method comprising:
detaching a first airspring assembly from the chassis and the axle of the vehicle;
deploying a second airspring assembly comprising:
a pressurizable chamber having a top end, a bottom end, and a flexible sidewall extending substantially vertically between the top and bottom ends; and
a substantially non-load bearing collapsible member having an upper end portion and a lower end portion, and a sidewall support portion, said collapsible member disposed within the pressurizable chamber, the collapsible member being extensible and collapsible along a longitudinal axis extending between the top and bottom ends responsive to pressurization and depressurization of the pressurizable chamber, respectively, the collapsible member configured to restrict lateral movement of the flexible sidewall toward the longitudinal axis;

wherein the sidewall support portion has a diameter greater than a diameter of the upper end portion and a diameter of the lower end portion; and attaching the top end and the bottom end of the second airspring assembly to the chassis and the axle, respectively.

27. The method as recited in claim 26, wherein the second airspring assembly comprises at least a portion of the first airspring assembly.

28. The method as recited in claim 26, wherein the collapsible member is longitudinally extendible while retaining a substantially rigid lateral perimeter.

* * * * *